(12) United States Patent
Peeters

(10) Patent No.: US 8,820,379 B2
(45) Date of Patent: Sep. 2, 2014

(54) MOULD SYSTEM AND METHOD FOR OPERATING SAID SYSTEM

(75) Inventor: Johannes Hendricus Alphonsus Peeters, Rotterdam (NL)

(73) Assignee: FiberCore IP B.V., Rotterdam (NL)

( * ) Notice: Subject to any disclaimer, the term of this patent is extended or adjusted under 35 U.S.C. 154(b) by 343 days.

(21) Appl. No.: 13/376,456

(22) PCT Filed: Jun. 7, 2010

(86) PCT No.: PCT/NL2010/050344
§ 371 (c)(1),
(2), (4) Date: Dec. 6, 2011

(87) PCT Pub. No.: WO2010/143946
PCT Pub. Date: Dec. 16, 2010

(65) Prior Publication Data
US 2012/0097324 A1 Apr. 26, 2012

(30) Foreign Application Priority Data
Jun. 8, 2009 (EP) .................................... 09162162

(51) Int. Cl.
B29C 33/00 (2006.01)
B29C 33/30 (2006.01)

(52) U.S. Cl.
CPC ............. B29C 33/307 (2013.01); B29C 33/308 (2013.01)
USPC .......................................... 156/500; 156/245

(58) Field of Classification Search
CPC ............................ B29C 33/307; B29C 33/308
USPC .................................................. 156/245, 500
See application file for complete search history.

(56) References Cited

U.S. PATENT DOCUMENTS

| 4,156,516 A | 5/1979 | Oliver |
| 7,398,586 B2 * | 7/2008 | Prichard et al. ................. 29/448 |

FOREIGN PATENT DOCUMENTS

| FR | 2 076 776 A | 10/1971 |
| GB | 1425312 A * | 2/1976 |
| GB | 2 268 699 A | 1/1994 |
| WO | WO-87/07233 A1 * | 12/1987 |
| WO | 2005/070642 A1 | 8/2005 |

OTHER PUBLICATIONS

International Search Report, dated Aug. 16, 2010, from corresponding PCT application.

* cited by examiner

*Primary Examiner* — Jeff Aftergut
(74) *Attorney, Agent, or Firm* — Young & Thompson

(57) ABSTRACT

A mold system for manufacturing a fiber reinforced plastic product includes a mold plate, an upstanding structure on top of the mold plate as well as a support device. The mold plate is deformable according to bending and/or torsion into deformed out-of-plane shapes. The upstanding structure is deformable according to the mold plate deformation, the mold plate and upstanding structure defining a circumferentially closed mold area, and the support device including multiple supports which interact with the mold plate and a base beneath the mold plate. The supports are adjustable for providing the deformed shapes of the mold plate and the upstanding structure.

14 Claims, 4 Drawing Sheets

MOULD SYSTEM AND METHOD FOR OPERATING SAID SYSTEM

The invention is related to the field of manufacturing fiber reinforced plastic products or composite products. Such products, which may be sandwich products, are applied for many different purposes. As an example, sandwich panels are fit for relatively high loads, such as for instance occur in a bridge deck or cantilever constructions and the like. Composite products are manufactured by successively depositing a number of layers on a mould surface. These layers include impermeable sheets as well as fiber layers which are impregnated with a resin. Under the influence of underpressure which is maintained in the space enclosed by the impermeable sheets, the resin is reliably spread through the mats. The product obtained can have any different shapes which are determined by the shape of the mould surface.

In the case of relatively small products which are manufactured in series, it is usually feasible to apply a dedicated fixed mould. However, in the case of large products such as bridges or bridge decks, usually only a single product or a small series of products is manufactured by means of a mould. The production of a small number of products by means of such process however has the disadvantage that the mould costs are relatively high and may even be prohibitive. This is also caused by the fact that the mould in question has a considerable size, in particular in the case of bridge decks.

The objective of the invention is therefore to provide a more economic way for producing large sandwich products, also in case a single product or a small series of products is produced. This objective is achieved by means of a mould system for manufacturing a fiber reinforced plastic product, said mould system comprising a mould plate, an upstanding structure on top of the mould plate as well as a support device, said mould plate being deformable according to bending and/or torsion into deformed out-of-plane shapes and said upstanding structure being deformable according to the mould plate deformation, said mould plate and upstanding structure defining a circumferentially closed mould area, and said support device comprising multiple supports which interact with the mould plate and a base beneath the mould plate, said supports being adjustable for providing said deformed shapes of the mould plate and the upstanding structure.

The mould system according to the invention first of all provides the possibility to adjust the shape of the mould space so as to accommodate different designs with for instance different curvatures and different dimensions in the length and width direction. Thus, the mould system can be used for a large number of different products or series of products. Secondly, the mould system is particularly fit for large products. The mould plate may be selected as desired with the required dimensions. Its size allows to deform it according to gradual curvatures in any direction, as is necessary for the shape of the product, such as a bridge deck.

The length and width dimensions of the product are generally defined by the size and shape of the upstanding structure which is positioned on top of he mould plate. Said upstanding structure is deformable in accordance with the deformations of the mould plate. In an embodiment which is fit for manufacturing a bridge deck, said upstanding structure may comprise at least two generally parallel rims of a bendable nature. The rims in question may extend in the longitudinal direction of the mould area, whereby the longitudinal sides of the bridge deck are defined.

With the purpose of making the upstanding rims deformable so as to follow the deformations of the mould plate, several measures can be taken. For instance, the rims might be carried out in a linked fashion. Preference is given to an embodiment according to which the rims comprise a multitude of strips or plates which are loosely stacked upon each other, said strips allowing mutual displacements in the longitudinal direction thereof. The strips stacked upon each other provide the height which is necessary for shaping the sides of the product. Nevertheless, the bending stiffness of such stack of strips is limited due to the fact that they are allowed to slide somewhat with respect to each other in their longitudinal direction. In other words, the bending stiffness of the stack is low due to its very low shear stiffness. Despite this deformability in bending, the other characteristics of the rims are a high stiffness in transverse direction, which is necessary for providing a reliable support of the assembly and a correct forming process of the product edges, and a high compressive stiffness for resisting pressures resulting from vacuum.

The play of the strips with respect to each other in the longitudinal direction can be obtained in different ways, for instance by providing guides on top of the mould plate. According to a preferred embodiment which does not alter the outer shape of the rims, strips may comprise longitudinally oriented, aligned and oblong apertures. A dowel is accommodated in said apertures; the dowel has a length which is smaller than the longitudinal dimension of the apertures and a width which is similar to the width of said apertures. The dowels in question may be fixed to the mould plate so as to define the position of the upstanding structure and thus of the mould area.

Preferably, the width dimension of the strips, as measured from the dowel to the inner strip surfaces which face the mould area, gradually diminishes from the undermost strip towards the uppermost strip. The rims in question thereby obtain a shape according to which the inner surfaces thereof have an obtuse angle with respect to the surface of the mould plate. This contributes to the process of removing the formed and hardened product from the mould.

Preferably, the upstanding structure may comprise at least two longitudinal rims and at least two transverse rims. Thus, a multitude of different sizes of the mould space can be obtained by varying the mutual distances of the longitudinal rims and of the transverse rims. Also, the shape of the mould space may be selected by positioning the rims in several particular fashions with respect to each other. For instance, the size of the mould area may be square or rectangular, but it is also possible to select an oblique shape. The latter option is of importance in the case of bridges which are to be part of a road trajectory with a non-perpendicular crossing with respect to a waterway and the like. Furthermore, opposite rims need not be parallel to each other but may also run under a small angle so as to obtain a slightly widening or narrowing shape.

Preferably, the transverse rims are accommodated between the longitudinal rims, the end faces of said transverse rims which are oriented towards the corresponding longitudinal rim being shaped in accordance with the shape of said longitudinal rim. By positioning the transverse rims at different locations along the length of the longitudinal rims, several length dimensions of the mould area may be obtained. Similarly, by selecting different length dimensions of the transverse rims, several width dimensions of the mould area may be obtained.

The transverse rims may each comprise a multitude of layers of strips which are stacked upon each other as well. In this way, the height of the transverse rims may be selected in dependence on the shape of the product to be manufactured, and furthermore the height of these transverse rims may be adjusted to the height of the longitudinal rims. For the purpose of selecting a specific length of the transverse rims, each layer of strips may comprise at least two strips which extend in the extension of one another, each of said two strips being mutually coupled.

The support device for supporting the mould plate may be carried out in several ways, for instance with support legs which are directly connected to the mould plate. Preference is given to an embodiment wherein the support device comprises beams, pipes or bars which extend generally parallel beneath the mould plate, each bar being supported by means of at least two extendable and retractable support legs. The bars provide an additional support for the mould plate and impart an evenly distributed deformation to said plate.

In a further improvement, the support bars may contact the underside of the mould plate in a rolling fashion and over in general the full length of said bars, each bar being supported by means of at least three regularly spaced legs. It is now possible to impart an upper concave or convex shape to the mould plate by extending the outermost legs more respectively less than the innermost leg(s). Through the use of such rolling bars, the mould plate will behave as an orthotropic plate which is relatively flexible in bending in one direction and which is relatively stiff in bending in the direction perpendicular thereto. In the case of a bridge deck, the bending stiffness is preferably high with respect to a bending axis oriented in longitudinal direction and relatively low with respect to a bending axis perpendicular thereto in transverse direction.

As mentioned before, the mould system according to the invention is first of all applied in a way which is similar to prior art production techniques. The impermeable layers together with the laminate in between are deposed in the mould area, and next the step of impregnating the laminate is applied and the product is left to harden. Of course, at the final stage of the production process the product once hardened is removed from the mould area. The latter step however may be onerous, in particular when dealing with large size objects such as bridge decks and cantilevered constructions and the like. In this connection, the invention provides a further improvement of the production process in that the mould system can be controlled in such a way that the step of removing the product from the mould area is greatly facilitated.

This is achieved by using the mould system according to the following steps:
controlling the support device so as to obtain a desired deformed shape of the mould area,
laying a bottom impermeable sheet over the mould area,
positioning an assembly of a number of fiber mats and possibly filling material on top of the bottom impermeable sheet,
laying a top impermeable sheet over the assembly,
sealing the bottom and top impermeable sheets with respect to each other,
applying an underpressure within the space sealed by said sheets,
introducing a flowable resin in said space while impregnating the fiber mats therewith,
making the resin harden,
detaching the assembly with adhering sheets from the mould system by moving at least a part of mould plate and/or the upstanding structure away from said assembly with adhered sheets while maintain the position of at least an other part of mould plate and/or the upstanding structure. Also, vacuum is applied between the bottom impermeable sheet and the mould for ascertaining a well defined shape of the product obtained.

First of all, the product is shaped and hardened in the mould system according to the traditional way. After the product has been hardened, it fits tightly within the mould area. By now making part of the mould plate and corresponding parts of the upstanding structure move away somewhat from the finished product, the latter becomes more easily accessible. Thus, a hoist or the like can be readily applied to the product so as to lift it from the mould area.

In particular, this can be achieved by the steps of:
maintaining the deformed shape of a central part of the mould area,
changing the shape of opposite ends of the mould area so as to move away the base plate from the assembly at those ends.

The invention will now be described further with reference to an embodiment of the mould system as shown in the drawings.

Figure 1:
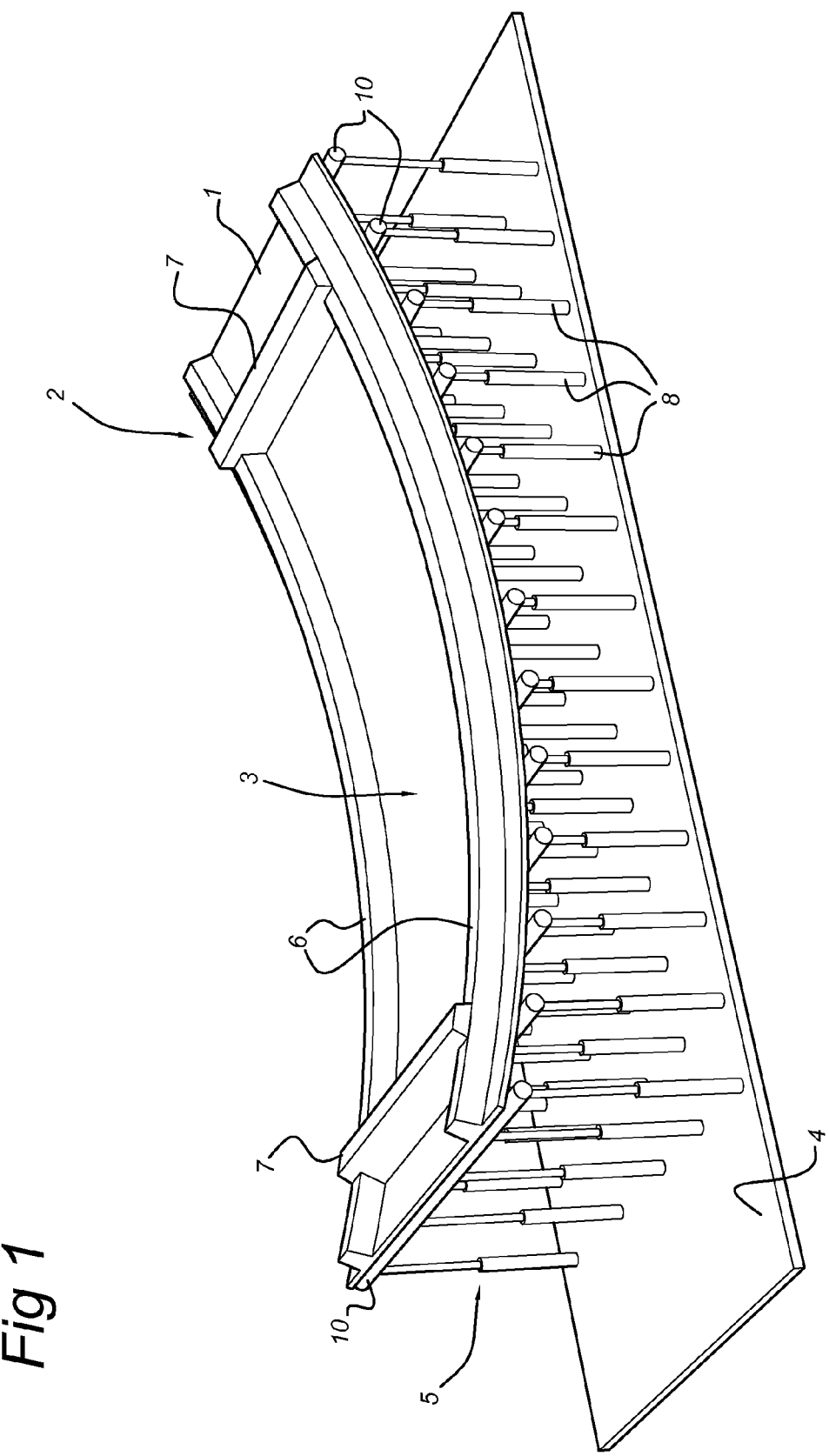
FIG. 1 shows the mould system according to the invention in perspective.

The mould system as shown in FIG. 1 comprises a mould plate 1 as well as an upstanding structure which has been indicated by the reference numeral 2. Said mould plate 1 and upstanding structure 2 define a circumferentially closed mould area 3. The mould plate 1, which may consist of wood, steel or plastic (HDPE), is supported with respect to the base 4 by means of the support device which has been indicated by reference numeral 5. Said base 4 is for instance the floor of a production space. On top of the mould plate 1, parallel longitudinal rims 6 have been provided as well as transverse rims 7 which extend between the longitudinal rims 6. Said rims 6, 7 and the mould plate 1 define the mould area 3 as mentioned before.

Figure 6:
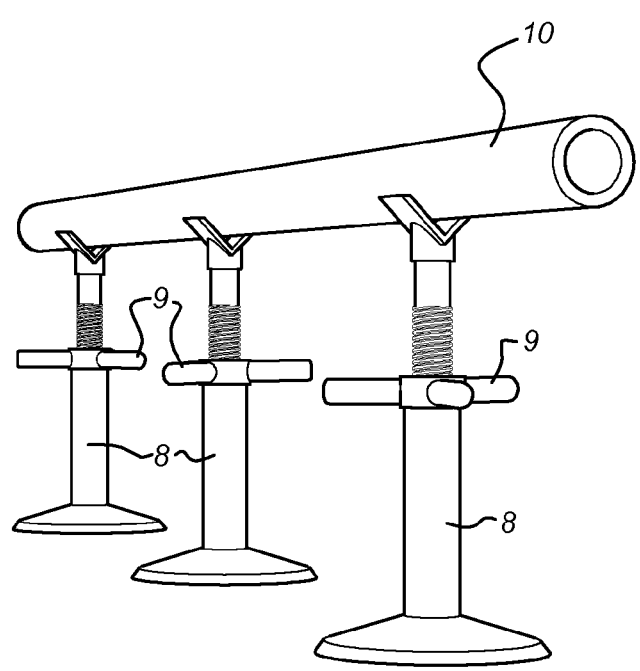
FIG. 6 shows a detail of the support device of the mould system.

The support device 5 consists of a multitude of the legs 8, the length of which can be adjusted. As shown in FIG. 6, these legs 8 may comprise a sliding mechanism and/or a screw mechanism 9 for changing the length. Said mechanism may be adjusted in a manual fashion, an electrical fashion using step motors or in a hydraulic fashion. The required shape of the mould plate may be controlled by a computer provided with a computer program for controlling these mechanisms. Furthermore, the legs 8 are connected to a transverse bar 10 which supports the mould plate 1. By controlling the length of these legs 8, a specific deformed out-of-plane shape of the mould plate 1 can be obtained, in dependence of the shape of the product to be produced. This shape may be upwardly concave as shown in FIG. 1, or convex (not shown). Also, a twisted or skewed shape is possible. As shown in FIG. 1, in particular the mould plate may be curved around transverse axes. However, by judiciously selecting the length of the legs 8 of each transverse bar 10, it is also possible to select a concave or convex upper surface of the mould plate 1 according to longitudinal axes.

In dependence of the curvature of the mould plate 1, the longitudinal rims 6 will have to obtain such curvature as well.

Figure 2:
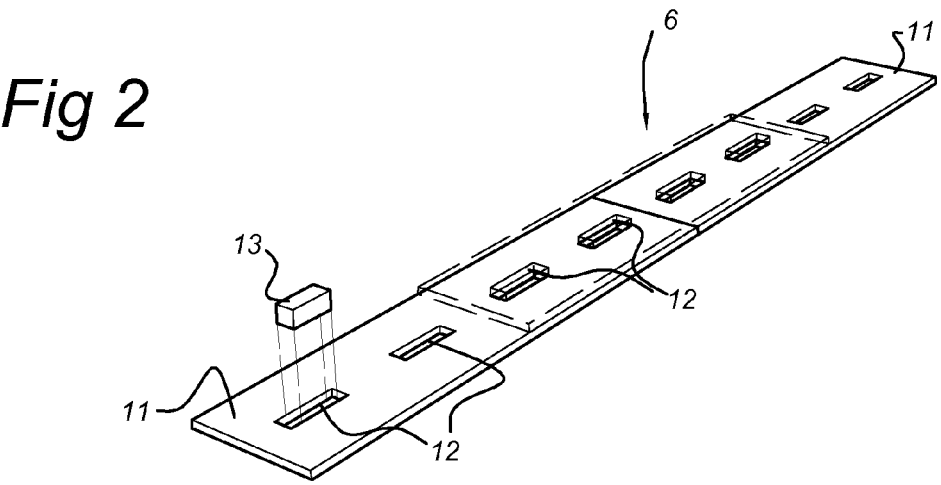
FIG. 2 shows a detail of a longitudinal rim of the mould system.
Figure 3:
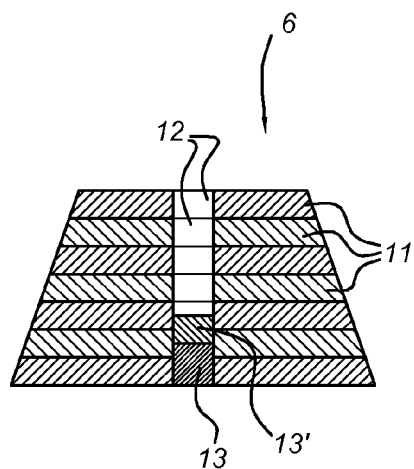
FIG. 3 shows a cross-section of the longitudinal rim according to III-III of FIG. 2.

On the other hand, the longitudinal rims 6 should be strong and stiff enough to withstand the forces exerted thereon once a multitude of layers for a specific product has been accommodated within the mould area 3. An example of a possible construction for the longitudinal runs 6 is shown in FIGS. 2 and 3. FIG. 2 shows a row of strips 11 which each have several longitudinal slots 12. These strips 11 are stacked up on each other as shown in FIGS 3, for instance in an overlapping fashion as depicted in broken lines in FIG. 2. After the strips 11 have been laid on the mould plate 1, dowels 13 are introduced into these slots 12. The dimension of the dowels 13 and the slots 12 has been selected in such a way that they tightly fit into each other in transverse direction, but allow some play in longitudinal direction. In other words, the dowels 13 have about the same width as the slots 12, but they have a shorter length than the slots 12. Furthermore, the height of each dowel 13 is equal to the thickness of the strips 11. The dowels 13 after insertion into the slots 12 are made to protrude to some extent above the strips, preferably to an amount which is half the thickness of the dowels. In this connection, the first dowel to be applied preferably has a thickness which is half the thickness of the strips. This protruding part of the dowels is used for insertion in the underside of the slots of strips positioned on top of the first strips. Thereby, a coherent yet flexible rim 6 is obtained which is firmly held on the mould plate 1.

Figure 4:
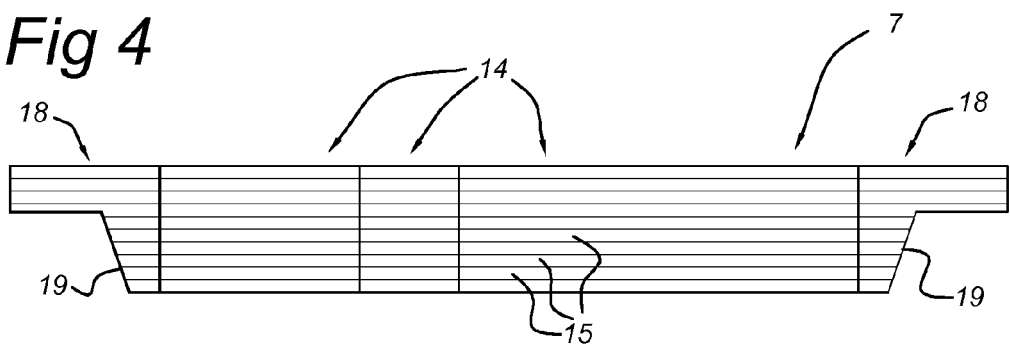
FIG. 4 shows a view on a transverse rim of the mould system.
Figure 5:
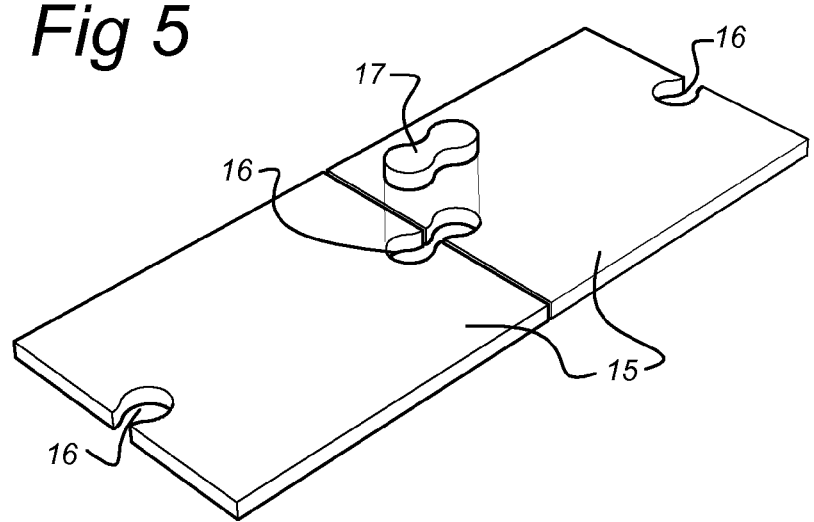
FIG. 5 shows a detail of a transverse rim.

The width of the mould area 3 is determined by the mutual distance of the longitudinal rims 6. Similarly, the length of the mould area 3 is determined by the mutual distance of the transverse rims 7. These transverse rims 7 extend between the longitudinal rims 6, which means that their length depends on the distance of said longitudinal rims 6. As shown in FIG. 4, the transverse rims 7 therefore consist of several stacks 14 of strips 15, the strips 15 of one stack having a length which differs from the length of the strips 15 in another stack 14. By means of a limited number of strips of different lengths, a large array of transverse rim lengths can be selected. The strips 15 of adjacent stacks do not overlap each other but are nevertheless connected to each other. An example of such interconnection of adjacent strips 15 is shown in FIG. 5. This example of an interconnection consists of undercut holes which open out on facing sides of the strips 15, together with correspondingly shaped connecting elements 17. The opposite ends of each transverse rim 7 consists of stacks 18 the shape of the end faces 19 of which are conformed to the shape of the sides of the longitudinal rims 6.

Figure 7:
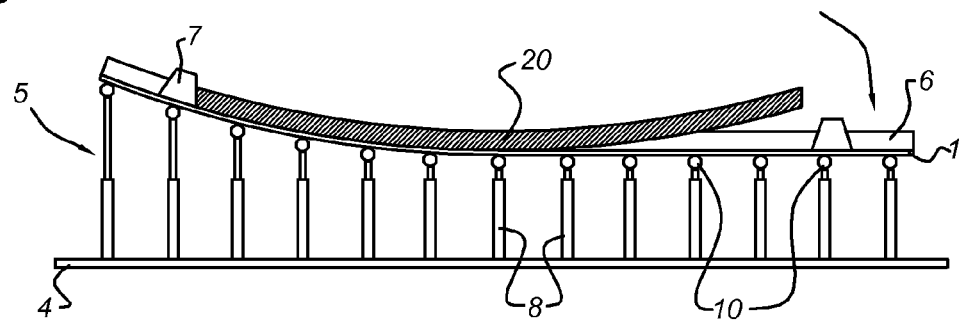
FIG. 7 shows a step of the use of the mould system.
Figure 8:
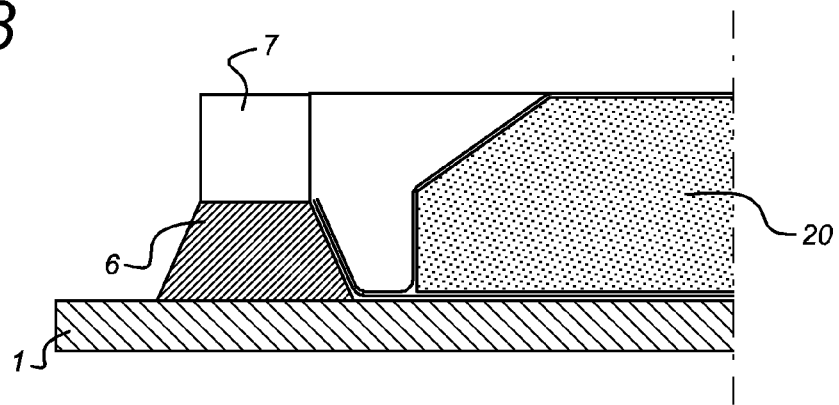
FIG. 8 shows a detail of the mould system with a product.
Figure 9:
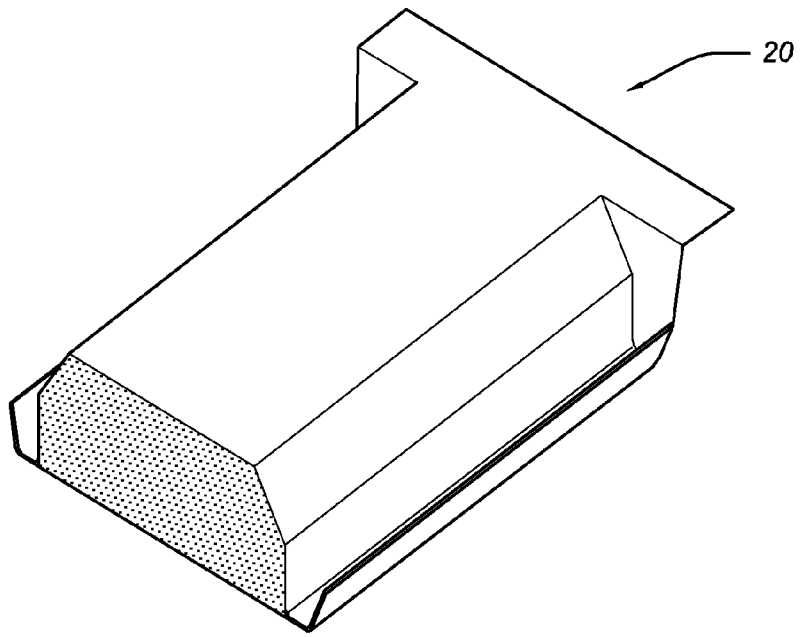
FIG. 9 shows a product manufactured by means of the mould system.

The detail of FIG. 8 shows a product 20 as manufactured in the mould system according to the invention. Said product 20 is resting in the mould system with a tight fit. With the aim of facilitating the release of the product 20, the mould system can be deformed as for instance shown in FIG. 7. While the central part of the mould plate 1 and longitudinal rims 6 is maintained, one end part thereof is moved downwardly by controlling the length of the legs 8 in an appropriate way. Thus, one end of the product is becoming free from the mould system, in such a way that the product 20 can be accessed and lifted upwardly. For completeness sake, an example of the product thus obtained is shown in FIG. 9. The product as shown in the mould system according to FIG. 8 being manufactured in a fashion upside down, it has been turned over to provide the bridge deck 20.

List Of Reference Numerals
1. Mould plate
2. Upstanding structure
3. Mould area
4. Base
5. Support device
6. Longitudinal rim
7. Transverse rim
8. Leg
9. Screw mechanism
10. Transverse bar
11. Strip longitudinal rim
12. Slot
13. Dowel
14. Stack of strips
15. Strip transverse rim
16. Undercut slot
17. Connecting element
18. End stack
19. End face
20. Product

The invention claimed is:

1. A mould system for manufacturing a fiber reinforced plastic product, comprising a mould plate, an upstanding structure on top of the mould plate as well as a support device, said mould plate being deformable according to bending and/or torsion into deformed out-of-plane shapes and said upstanding structure being deformable according to the mould plate deformation, said mould plate and upstanding structure defining a circumferentially closed mould area, and said support device comprising multiple supports which interact with the mould plate and a base beneath the mould plate, said supports being adjustable for providing said deformed shapes of the mould plate and the upstanding structure,
wherein the upstanding structure comprises at least two generally parallel rims of a bendable nature, wherein the rims comprise a multitude of strips which are stacked upon each other and possibly overlap each other, said strips allowing mutual displacements in the longitudinal direction thereof.

2. The mould system according to claim 1, wherein the strips comprise longitudinally oriented, aligned and oblong apertures, a dowel being accommodated in said apertures, said dowel having a length which is smaller than the longitudinal dimension of the apertures and a width which is similar to the width of said apertures.

3. The mould system according claim 2, wherein the width dimension of the strips, as measured from the dowel to the inner strip surfaces which face the mould area, gradually diminishes from the undermost strip towards the uppermost strip.

4. The mould system according to claim 2, wherein the width dimension of the strips, as measured from the dowel to the outer strip surfaces, gradually diminishes from the undermost strip towards the uppermost strip.

5. The mould system according to claim 1, wherein the upstanding structure comprises two at least two longitudinal rims and at least two transverse rims.

6. The mould system according to claim 5, wherein the transverse rims are accommodated between the longitudinal rims, the end faces of said transverse rims which are oriented towards the corresponding longitudinal rim being shaped in accordance with the shape of said longitudinal rim.

7. The mould system according to claim 6, wherein the transverse rims each comprise a multitude of layers or stacks of strips which are stacked upon each other.

8. The mould system according to claim 7, wherein each layer of strips comprise at least two strips which extend in the extension of one another, each of said two strips being mutually coupled.

9. The mould system according to claim 1, wherein the inner face of each rim which is oriented towards the mould area, and the mould plate, and/or the outer face of the rim and the mould plate, enclose an obtuse angle.

10. The mould system according to claim 1, wherein the support device comprises bars which extend generally parallel beneath the mould plate, each bar being supported by means of at least two extendable and retractable support which may be adjusted under computer control.

11. The mould system according to claim 10, wherein the support bars are rotatable around the longitudinal direction thereof and engage the underside of the mould plate in a rolling fashion over in general the full length of said bars, each bar being supported by means of at least three regularly spaced legs.

12. The mould system according to claim 3, wherein the width dimension of the strips, as measured from the dowel to the outer strip surfaces, gradually diminishes from the undermost strip towards the uppermost strip.

13. The mould system according to claim 2, wherein the upstanding structure comprises two at least two longitudinal rims and at least two transverse rims.

14. The mould system according to claim 2, wherein the inner face of each rim, which is oriented towards the mould area, and the mould plate, and/or the outer face of the rim and the mould plate, enclose an obtuse angle.

* * * * *